(12) United States Patent
Morcrette

(10) Patent No.: US 10,047,520 B2
(45) Date of Patent: Aug. 14, 2018

(54) THERMAL INSULATION SYSTEM AND KIT, AND METHOD FOR INSTALLING SAME

(71) Applicant: SAINT-GOBAIN ISOVER, Courbevoie (FR)

(72) Inventor: Alice Morcrette, Amiens (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 15/529,839

(22) PCT Filed: Nov. 27, 2015

(86) PCT No.: PCT/FR2015/053248
§ 371 (c)(1),
(2) Date: May 25, 2017

(87) PCT Pub. No.: WO2016/083760
PCT Pub. Date: Jun. 2, 2016

(65) Prior Publication Data
US 2017/0260740 A1 Sep. 14, 2017

(30) Foreign Application Priority Data
Nov. 28, 2014 (FR) .................................... 14 61675

(51) Int. Cl.
*E04B 1/80* (2006.01)
*E04B 1/76* (2006.01)

(52) U.S. Cl.
CPC ............ *E04B 1/803* (2013.01); *E04B 1/7608* (2013.01); *E04B 1/7625* (2013.01);
(Continued)

(58) Field of Classification Search
CPC ...... E04B 1/803; E04B 1/7608; E04B 1/7629; E04B 1/7625; Y02B 80/12
(Continued)

(56) References Cited

U.S. PATENT DOCUMENTS 3,231,944 A * 2/1966 Bennett ................. E04B 1/7666
116/63 P
3,961,454 A * 6/1976 Adams .................... E04C 2/292
52/404.1
(Continued)

FOREIGN PATENT DOCUMENTS

CH 687 932 A5 3/1997
DE 20 2004 004 187 U1 6/2005
(Continued)

OTHER PUBLICATIONS

International Search Report dated Feb. 10, 2016 in PCT/FR2015/053248 filed Nov. 27, 2015.

*Primary Examiner* — Brent W Herring
(74) *Attorney, Agent, or Firm* — Oblon, McClelland, Maier & Neustadt, L.L.P

(57) ABSTRACT

An encased insulating panel includes a vacuum insulation panel in the form of a rectangular sheet including a compression-resistant porous material and a barrier envelope which in gastight manner encases the porous material, and at least one fixing strip having a width (l) and a length, the length being greater than the perimeter of the vacuum insulation panel, each fixing strip forming an envelope around at least part of four successive faces of the vacuum insulation panel and including two free ends which can be joined together to form an attachment flap, the or each fixing strip being assembled securely to the vacuum insulation panel.

16 Claims, 13 Drawing Sheets

Figure 1:
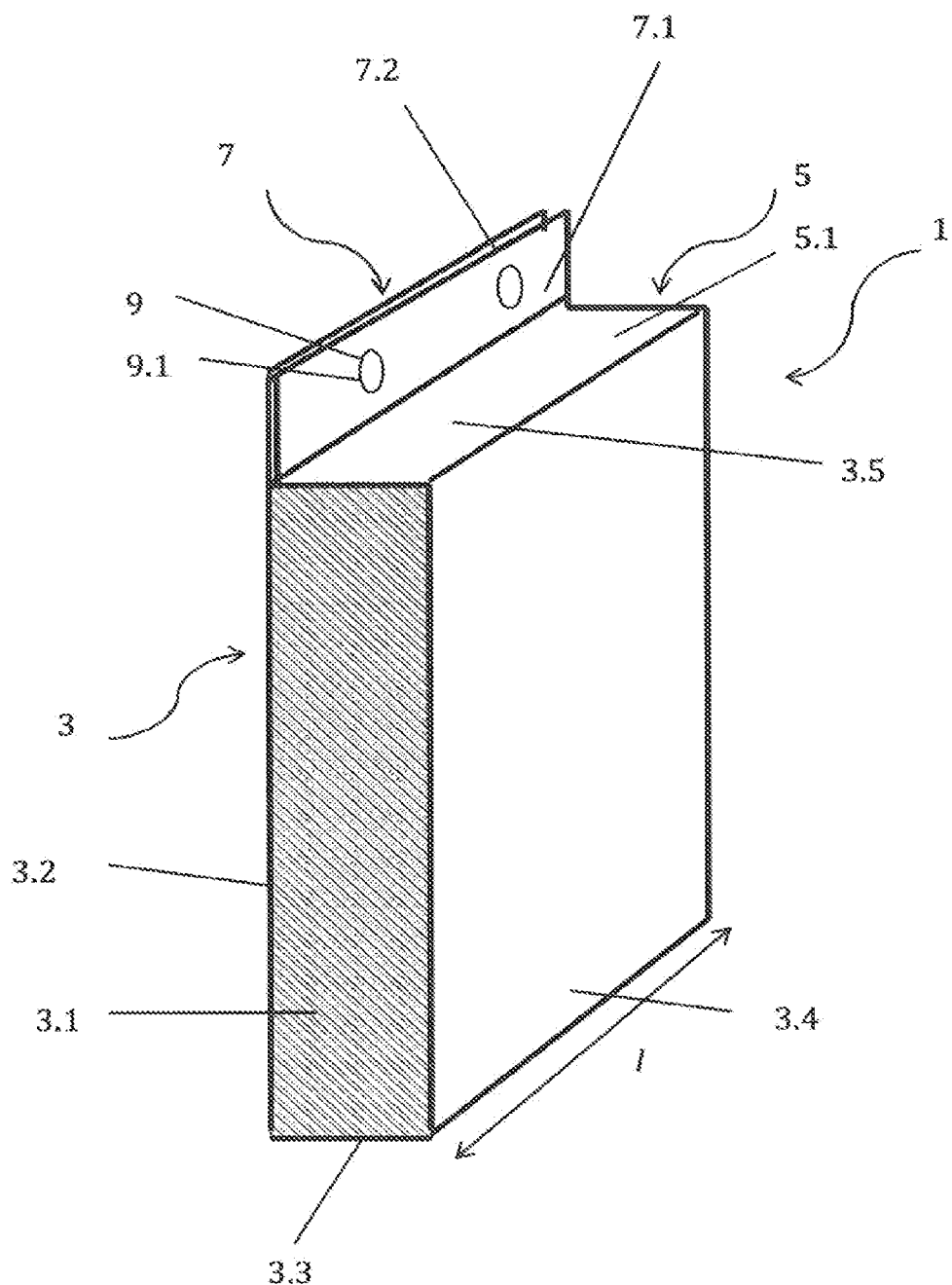

(52) U.S. Cl.
CPC ........... *E04B 1/7629* (2013.01); *Y02A 30/242* (2018.01); *Y02B 80/12* (2013.01)

(58) Field of Classification Search
USPC ........... 52/404.1, 406.1, 406.2, 407.2, 404.4, 52/407.5
See application file for complete search history.

(56) References Cited

U.S. PATENT DOCUMENTS

| | | | | |
|---|---|---|---|---|
| 4,452,162 A * | 6/1984 | Harbaugh | ............... | B63B 25/16 114/74 A |
| 4,494,348 A * | 1/1985 | Kastelic | ................ | E04C 2/405 52/404.4 |
| 4,709,523 A * | 12/1987 | Broderick | ............... | E04B 1/767 428/124 |
| 4,972,644 A * | 11/1990 | Rumiesz, Jr. | ........... | E04B 1/762 428/172 |
| 5,652,972 A * | 8/1997 | Chartrand | ............. | E04H 4/0043 219/535 |
| 5,693,399 A * | 12/1997 | Himeshima | ........... | F16L 59/065 428/69 |
| 5,857,307 A * | 1/1999 | Takemasa | ............... | E04B 1/803 52/404.4 |
| 5,950,395 A * | 9/1999 | Takemasa | ............. | F25D 23/062 52/404.4 |
| 5,987,833 A * | 11/1999 | Heffelfinger | ............ | E04B 1/767 383/211 |
| 6,083,603 A * | 7/2000 | Patel | ....................... | E04B 1/767 156/204 |
| 6,221,464 B1 * | 4/2001 | Patel | ....................... | E04B 1/767 428/192 |
| 6,335,074 B1 * | 1/2002 | Gasteyer, III | ............. | B32B 3/04 312/296 |
| 6,436,505 B2 * | 8/2002 | Kuroda | ................. | F16L 59/065 428/69 |
| 6,579,586 B1 * | 6/2003 | Fay | ......................... | E04B 1/767 428/192 |
| 6,796,094 B1 * | 9/2004 | Kelemen | ............... | E04B 2/8635 405/262 |
| 6,863,949 B2 * | 3/2005 | Ehrmanntraut | ......... | B29C 63/04 428/121 |
| 7,805,901 B2 * | 10/2010 | Yamada | .................... | E04B 1/76 52/404.1 |
| 2004/0055227 A1 * | 3/2004 | Allwein | ................. | E04B 1/767 52/98 |
| 2009/0031659 A1 * | 2/2009 | Kalfon | .................... | E04B 1/803 52/404.1 |
| 2010/0095629 A1 * | 4/2010 | Taylor | ....................... | E04B 2/08 52/570 |
| 2010/0281784 A1 * | 11/2010 | Leo | ........................ | E04B 1/0023 52/16 |
| 2011/0120049 A1 * | 5/2011 | Leo | ........................ | E04B 1/0023 52/782.1 |
| 2013/0125487 A1 * | 5/2013 | Power | ....................... | E04B 1/70 52/302.3 |
| 2014/0087158 A1 * | 3/2014 | Ciuperca | .................. | B32B 7/02 428/215 |
| 2014/0331586 A1 | 11/2014 | Bruno et al. | | |
| 2017/0234005 A1 * | 8/2017 | Yuasa | ....................... | E04B 2/26 52/406.2 |

FOREIGN PATENT DOCUMENTS

| | | |
|---|---|---|
| EP | 0 114 687 A2 | 8/1984 |
| EP | 1 496 167 A2 | 1/2005 |
| EP | 2 468 971 A1 | 6/2012 |
| FR | 1 250 228 | 11/1960 |
| GB | 2477401 A | 8/2011 |
| JP | 2012229618 A * | 11/2012 |
| WO | 2013/086005 A1 | 6/2013 |

* cited by examiner

THERMAL INSULATION SYSTEM AND KIT, AND METHOD FOR INSTALLING SAME

The present description relates to thermal insulation systems used in the field of building for lining walls. The present description relates more particularly to systems for lining a wall of a building using elementary insulating panels which are assembled to at least partially cover the wall, and it relates in particular to panels of the VIP (vacuum insulation panel) type. The present description also relates to a kit for mounting and fixing elements for lining a wall of a building and to a method for insulating a wall either from the inside or from the outside.

PRIOR ART

Panels of the VIP type are, as known, made up: of a membrane envelope which provides gastightness and of a rigid panel made of a porous material that has insulating properties, placed inside this envelope and kept under vacuum by means of this envelope. The porous panel, which is usually made of a material such as silica fume, an aerogel, perlite, or fiberglass, gives the panel its shape and mechanical strength.

Such panels are useful for thermally insulating a wall because their insulating performance is high for a low thickness and bulk.

At the time of manufacture of the panels of the VIP type, the gases are evacuated from the porous insulating material before the latter is vacuum packed in a flexible barrier envelope. The latter is generally made of a film that can be thermally bonded and which may comprise several layers of distinct materials and is designed to prevent the creation of thermal bridges at the edge faces.

Given the features involved in their design, VIPs cannot be cut and neither can they be perforated or drilled in order to assemble them on a wall, because if they were, the vacuum would be destroyed.

They are difficult to handle because the barrier envelope is fragile. Any damage to the barrier envelope through the application of mechanical stresses or by chemical treatments leads to a loss in performance of the insulating assembly.

Moreover, it is desirable for the panels to be assembled contiguously so as to avoid the creation of thermal bridges and avoid air circulating around the assembly.

Various systems for the mechanical fixing of insulating panels are known from the prior art: for example FR2849461, US2006/0265988, WO2014/128378 describe systems for assembling panels of VIP type on a wall using rigid profile sections (made of metal or rigid plastic) into which the panels are instead and in which same are held.

However, handling VIPs on a building site and securing them using rigid structures of the profile section type carries with it risks of perforating or damaging these panels. Furthermore, the architecture of the VIP fixing structures disclosed in these documents is highly complex, and therefore expensive, and it takes a great deal of time to fit and assemble the panels.

There is therefore still a need for a system that allows insulating panels to be assembled and fixed on a wall and which is at once simple to operate, inexpensive, carries little or no risk of damaging the panels, in particular VIPs, and makes it possible to overcome the aforementioned disadvantages of the earlier solutions.

SUMMARY OF THE INVENTION

One subject of the invention is an encased insulating panel comprising

- a vacuum insulation panel in the form of a rectangular sheet comprising a compression-resistant porous material and a barrier envelope which in gastight manner encases the porous material, and
- at least one fixing strip having a width and a length, the length being greater than the perimeter of the vacuum insulation panel, each fixing strip forming an envelope around at least part of four successive faces of the vacuum insulation panel and comprising two free ends which can be joined together to form an attachment flap, the or each fixing strip being assembled securely to the vacuum insulation panel.

According to one exemplary embodiment, the encased insulating panel further comprises fixing means allowing the attachment flap to be fixed mechanically to a wall. These fixing means for example comprise perforations in the attachment flap.

According to one exemplary embodiment, the fixing strip constitutes the barrier envelope and in gastight manner encases the porous material.

In this case, the fixing strips forms an envelope around the six faces of the vacuum insulation panel.

According to another exemplary embodiment on the other hand, the fixing strip may surround the barrier envelope of the vacuum insulation panel.

According to one example, the fixing strip is made of fiberglass or based on fiberglass.

According to one example, the fixing strip is fixed to the vacuum insulation panel by adhesive bonding or thermal bonding.

According to one example, the width of the fixing strip is substantially equal to the width of the vacuum insulation panel.

According to one example, the encased insulating panel comprises at least two fixing strips each having a width less than the width of the vacuum insulation panel.

According to one example, the encased insulating panel further comprises a lining sheet, notably a sheet of compressible foam, likewise wrapped by the fixing strip.

The fixing strip may be made up of a film of any suitable material or combination of materials, notably a woven or nonwoven material, a polymer, for example polypropylene, etc. The film may also be made up of several layers of distinct materials.

Another subject of the invention is a kit for mounting and possibly fixing an encased insulating panel as defined hereinabove, comprising

- a vacuum insulation panel in the form of a rectangular sheet comprising a compression-resistant porous material and a barrier envelope which in gastight manner encases the porous material, and
- at least one fixing strip having a width and a length, the length being greater than the perimeter of the vacuum insulation panel, each fixing strip being adapted for forming an envelope around at least part of four successive faces of the vacuum insulation panel while keeping two free ends which can be joined together to form an attachment flap.

According to one exemplary embodiment, the kit further comprises means allowing the fixing strip to be assembled securely to the vacuum insulation panel to form an encased insulating panel. These means for example comprise adhesive or a hook-and-loop tape.

According to one example, the kit further comprises fixing means allowing mechanical fixing of the attachment flap to a wall, notably, but nonlimitingly, at least a hook, a nail, a screw, a staple, a rivet or adhesive.

According to one example, the kit further comprises a lining sheet, notably a sheet of compressible foam.

This lining sheet may be intended to be likewise wrapped by the fixing strip or may be intended to be positioned against the internal face(s) of one or more encased insulating panels to hold said panels away from the wall against which they are fixed.

Another subject of the invention is a system for lining a wall of a building comprising a plurality of encased insulating panels as defined hereinabove, in which the encased insulating panels are set out in at least one layer of panels forming rows, each encased insulating panel comprises an internal face facing toward the wall and an external face opposite the internal face, the attachment flap of each encased insulating panel is fixed to the wall using mechanical fixing means, the panels are arranged in such a way that each panel of an upper row covers the attachment flap of the panel immediately below it, the lower face of the upper panel being assembled contiguously with the upper face of the lower panel.

Another subject of the invention is a method for lining a wall of a building with encased insulating panels as defined hereinabove, notably for creating a lining system as defined hereinabove, this method comprising the following steps:

fixing the attachment flap of a first encased insulating panel to the wall using a mechanical fixing means, fixing the attachment flaps of the other panels so as to form a contiguous assembly of insulating panels, each panel being arranged so that it covers the fixing flap of the panel immediately below it.

According to one exemplary embodiment, the method according to the invention further comprises the following preliminary steps:

assembling onto each vacuum insulation panel at least one fixing strip of a length greater than the perimeter of the vacuum insulating panel, so that said fixing strip forms an envelope around at least part of four successive faces of the vacuum insulation panel, so as to keep two free ends at the end of the strip, and bringing the ends of the strip together to form an attachment flap so as to form an encased insulating panel.

According to one exemplary embodiment, each encased insulating panel comprises an internal face facing toward the wall and an external face opposite the internal face, and the internal faces of the encased insulating panels are held away from the wall and arranged substantially vertically using a layer of adhesive and/or using spacer piece(s) or a sheet of compressible foam.

According to one exemplary embodiment, the method further comprises the application of a layer of mortar to the external faces of the assembled encased insulating panels.

In this case, it is particularly advantageous for the fixing strip to be made of a mortar-resistant material such as a fiberglass fabric.

The insulating system according to the invention offers numerous advantages: it makes it possible to use VIPs which are very thin and offer very good insulation. The method of assembly and of fixing avoids the use of components likely to form thermal bridges. It is easy to implement and inexpensive. This assembly and fixing method reduces the risk of damage to the VIPs while they are being installed on a wall. This method can also be used for other types of insulating panels.

This system is extremely flexible in its embodiments: the securing of the fixing envelopes to the insulating panels, particularly the VIPs, can be done at the factory at the time of manufacture. This is what has been done in the alternative form illustrated in FIG. 4. For the systems in which the envelope is not thermally bonded around the insulating panel but is adhesively bonded or attached by some other means such as a hook-and-loop tape, the assembly of the envelope around the panels can be done at the factory or on the building site.

The present description also relates to a kit for mounting and fixing elements for lining a wall of a building, comprising:

at least one insulating panel in the form of a rectangular sheet, this kit being characterized in that it further comprises:

at least one fixing strip made up of a film of material of a length greater than the perimeter of a panel, each fixing strip forming an envelope around at least part of four successive faces of the insulating panel and having two free ends which can be joined together to form an attachment flap, means allowing the fixing strips to be assembled securely to the insulating panels to form encased insulating panels.

The present description also relates to a system for lining a wall of a building, comprising:

insulating panels in the form of rectangular sheets, the panels being set out in at least one layer of panels forming rows, this system being characterized in that it further comprises:

fixing strips made up of a film of material of a length greater than the perimeter of the sheets, each fixing strip forming an envelope around at least part of four successive faces of an insulating panel and comprising two free ends joined together forming an attachment flap, the fixing strips being assembled to the insulating panels so that they are firmly secured to these panels to form encased insulating panels, each encased insulating panel comprising an internal face facing toward the wall and an external face opposite the internal face, the attachment flap of each encased insulating panel being fixed to the wall using mechanical fixing means, The panels being arranged in such a way that each panel of an upper row covers the attachment flap of the panel immediately below it, the lower face of the upper panel being assembled contiguously with the upper face of the lower panel, the encased insulating panels being arranged substantially vertically.

The present description also relates to a method for lining a wall of a building comprising the supply of insulating panels, this method being characterized in that it comprises the following steps:

assembling onto each insulating panel at least one fixing strip made up of a film of material of length greater than the perimeter of the panel, on at least part of four successive faces of each insulating panel, so as to leave two free ends at the end of the film, bringing the ends of the film together to form an attachment flap so as to form an encased insulating panel, fixing the attachment flap of a first encased insulating panel 1 to the wall using a mechanical fixing means, fixing the attachment flaps of the other panels in such a way as to form a contiguous assembly of insulating panels, each panel being arranged in such a way as to cover the attachment flap of the panel immediately below it.

According to some preferred embodiments, the present description also relates to the following elements (notably compatible with the encased insulating panel, the kit, the system and the method according the invention, which were defined hereinabove):

A kit of the type defined hereinabove further comprising means allowing mechanical fixing of the attachment flap to the wall.

A lining kit, system and method of a type defined hereinabove, in which the insulating panels are in the form of rectangular sheets comprising a compression-resistant porous material and a barrier envelope encasing the porous material, the barrier envelope being gastight and allowing an internal vacuum to be maintained.

A lining kit, system and method of a type defined hereinabove in which the fixing strip forms an envelope round the six faces of the sheet.

A lining kit, system and method of a type defined hereinabove in which the fixing strip is made from or based on fiberglass fabric.

A lining kit, system and method of a type defined hereinabove in which the fixing strips are fixed to the insulating panels by adhesive bonding or thermal bonding.

A lining kit, system and method of a type defined hereinabove in which the fixing strips are fixed to the insulating panels and to the wall by a fastener.

A lining kit, system and method of a type defined hereinabove in which the attachment flaps comprise perforations allowing them to be fixed to the wall.

A kit of a type defined hereabove in which the fixing strips are assembled securely to the insulating panels to form encased insulating panels. What is then meant by a kit is a collection of insulating panels thus encased which are ready to use for lining.

A lining kit, system and method of a type defined hereinabove in which the fixing strip is of a width (l) substantially equal to the width (L) of the insulating panel.

A lining kit, system and method of a type defined hereinabove in which the lateral faces of the encased insulating panels are covered with a reinforcing strip.

A lining kit, system and method of a type defined hereinabove in which the fixing strip has a width (l) less than the width (L) of the insulating panel.

A lining kit, system and method of a type defined hereinabove in which each panel is associated with at least two fixing strips.

A lining kit, system and method of a type defined hereinabove which further comprises at least one spacer piece of a size that allows the panel to be fixed substantially parallel to the wall, the spacer piece(s) being in the form of discrete points, laths or sheets, able to afford localized, linear or surface contact with the panel.

A lining kit, system and method of a type defined hereinabove which further comprises a sheet of compressible foam.

A lining kit, system and method of a type defined hereinabove in which the encased insulating panel has a cutout in the lower part of one face.

A lining system and method of a type defined hereinabove in which the mechanical fixing means provide both fixing to the wall and securing of the or each fixing strip to an insulating panel.

A lining system and method of a type defined hereinabove in which the internal faces of the encased insulating panel are adhesively bonded to the wall.

A lining system and method of a type defined hereinabove in which the internal faces of the encased insulating panels are held away from the wall and arranged substantially vertically using a layer of adhesive and/or using spacer piece(s) or a sheet of compressible foam.

A lining system and method of a type defined hereinabove in which the lateral faces of two successive panels of one and the same row are assembled contiguously.

A system which further comprises an external facing.

A lining method of a type defined hereinabove which further involves the use of an external facing.

A lining system and method of a type defined hereinabove in which the external face of each encased insulating panel is made of fiberglass.

A lining system of a type defined hereinabove which further comprises an external facing in which the facing comprises a layer of mortar applied to the external faces of the assembled encased insulating panels.

A lining method of a type defined hereinabove which further comprises the use of an external facing in which the facing comprises a layer of mortar applied to the external faces of the assembled encased insulating panels.

A lining system and method of a type defined hereinabove in which the facing is a self-supporting lining.

A lining system which further comprises sheets of compressible foam on the internal face of the insulating panels.

A lining method of a type defined hereinabove which further comprises the use of sheets of compressible foam on the internal face of the insulating panels.

A lining system which further comprises sheets of compressible foam between the internal face of the encased insulating panels and the wall.

A lining method of a type defined hereinabove which further comprises the use of sheets of compressible foam between the internal face of the encased insulating panels and the wall.

A lining system and method of a type defined hereinabove in which the encased insulating panels comprise cavities for housing the mechanical fixing means.

A method of a type defined hereinabove in which the encased insulating panels are arranged in rows ($R_1$, $R_2$), the method involving fixing each lower row ($R_1$) before fixing the row immediately above it ($R_2$).

A method of a type defined hereinabove in which the wall is a wall comprising a top face, the last row of panels being attached to the wall by fixing the attachment flap to the top face of the wall.

FIGURES

FIG. 1: Schematic perspective view of an insulating panel 3 encased in a fixing strip 5

Figure 2:
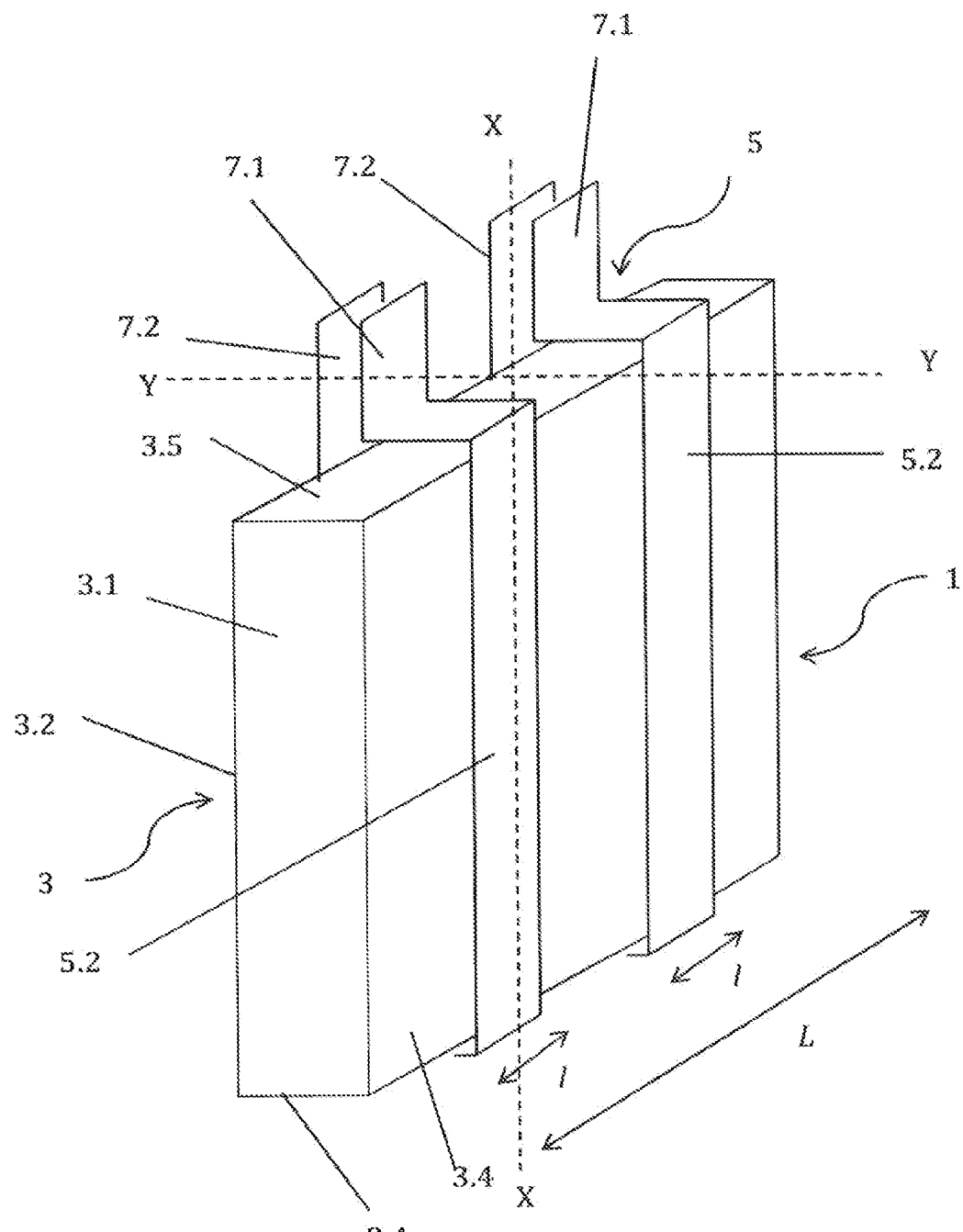

FIG. 2: Schematic perspective view of an insulating panel 3 encased by two fixing strips 5 before the strips 5 are adhesively bonded to the panel 3

Figure 3:
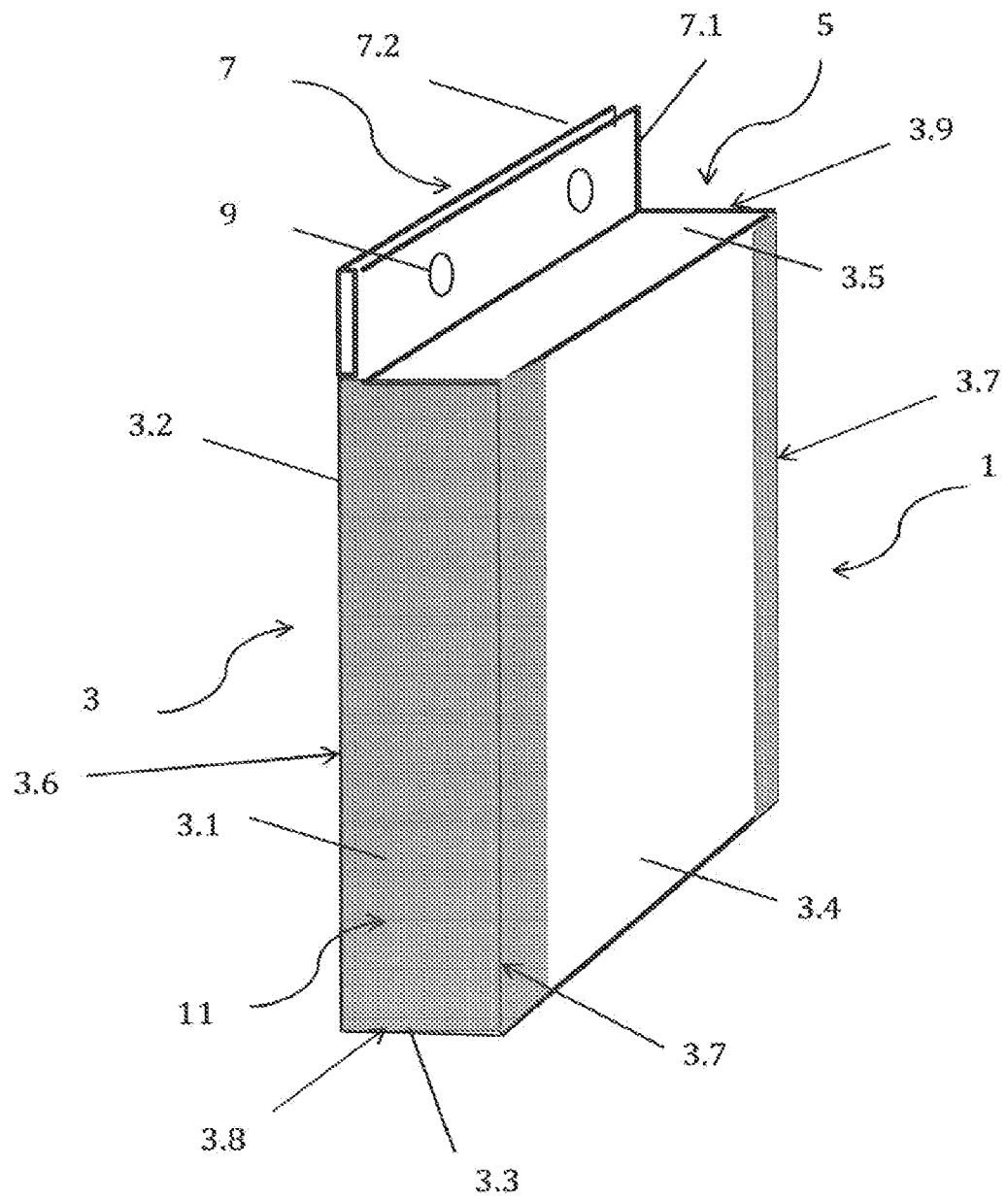

FIG. 3: Schematic perspective view of an encased insulating panel 1 in a fixing strip 5 and the lateral faces 3.1 of which are covered with a reinforcing strip 11

Figure 4:
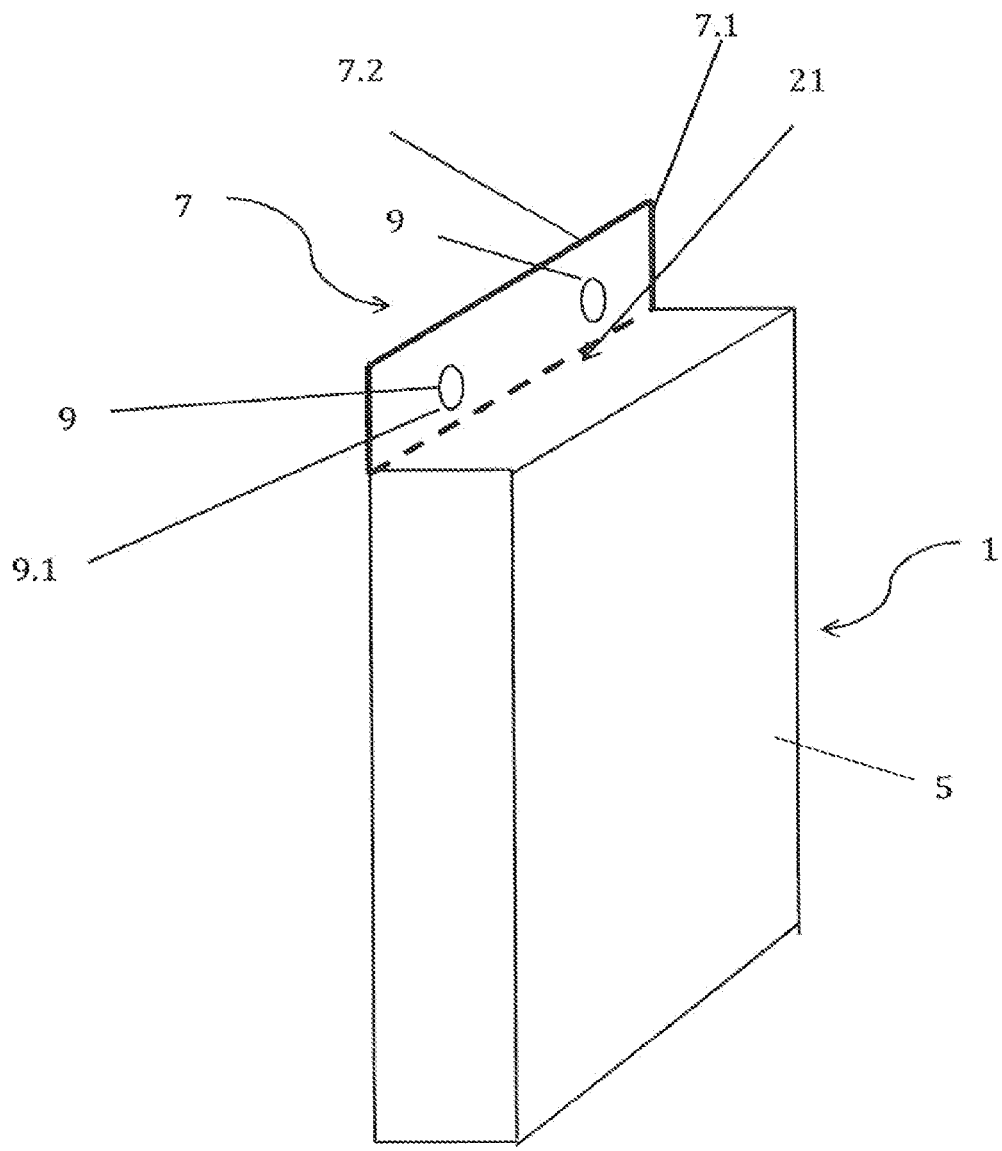

FIG. 4: Schematic perspective view of an encased insulating panel 1 of which the flexible barrier envelope forms the fixing strip 5

Figure 5:
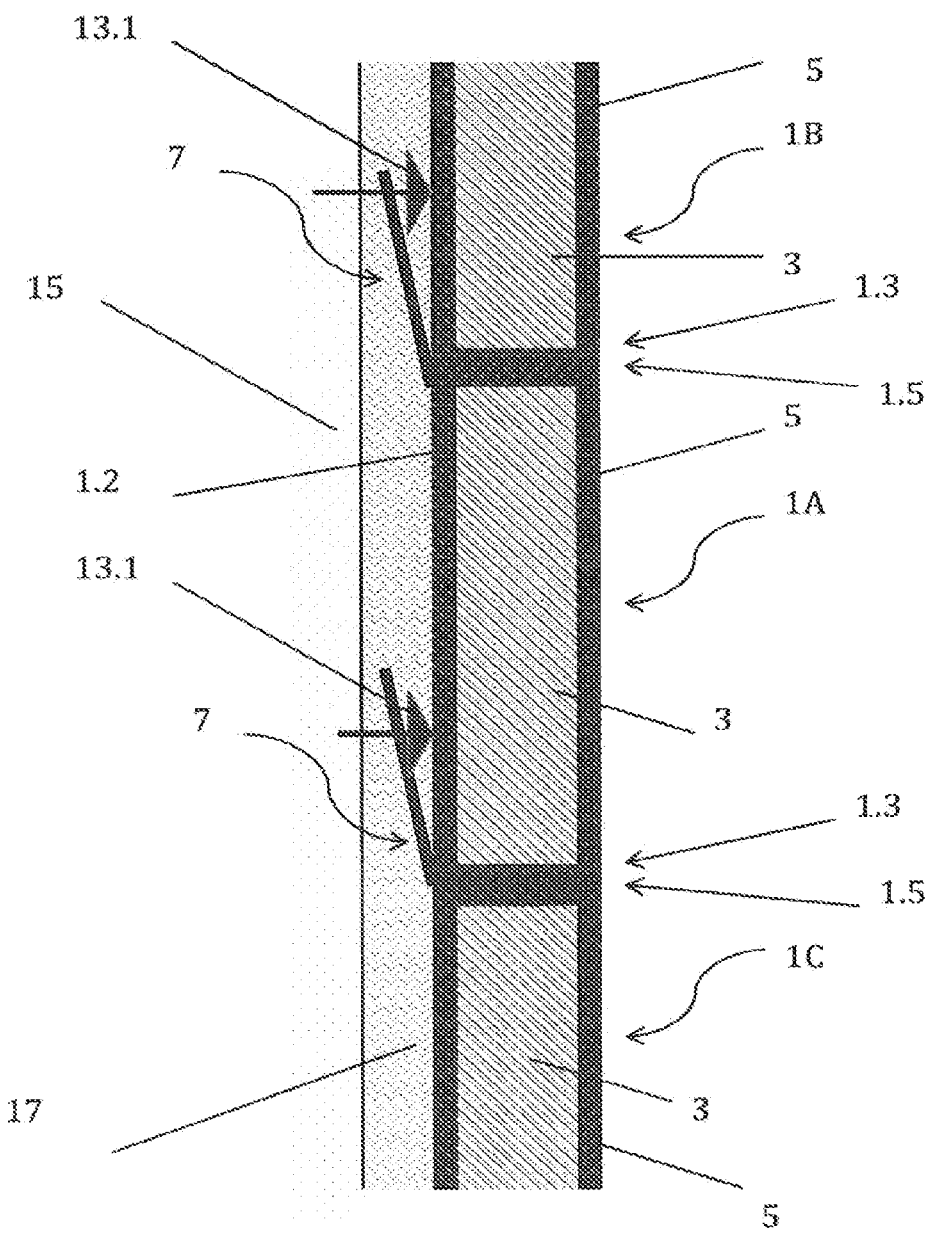

FIG. 5: View in section of the fixing of an encased insulating panel 1 to a wall 15 using mechanical means 13.1 and adhesive bonding to the wall 15

Figure 6:
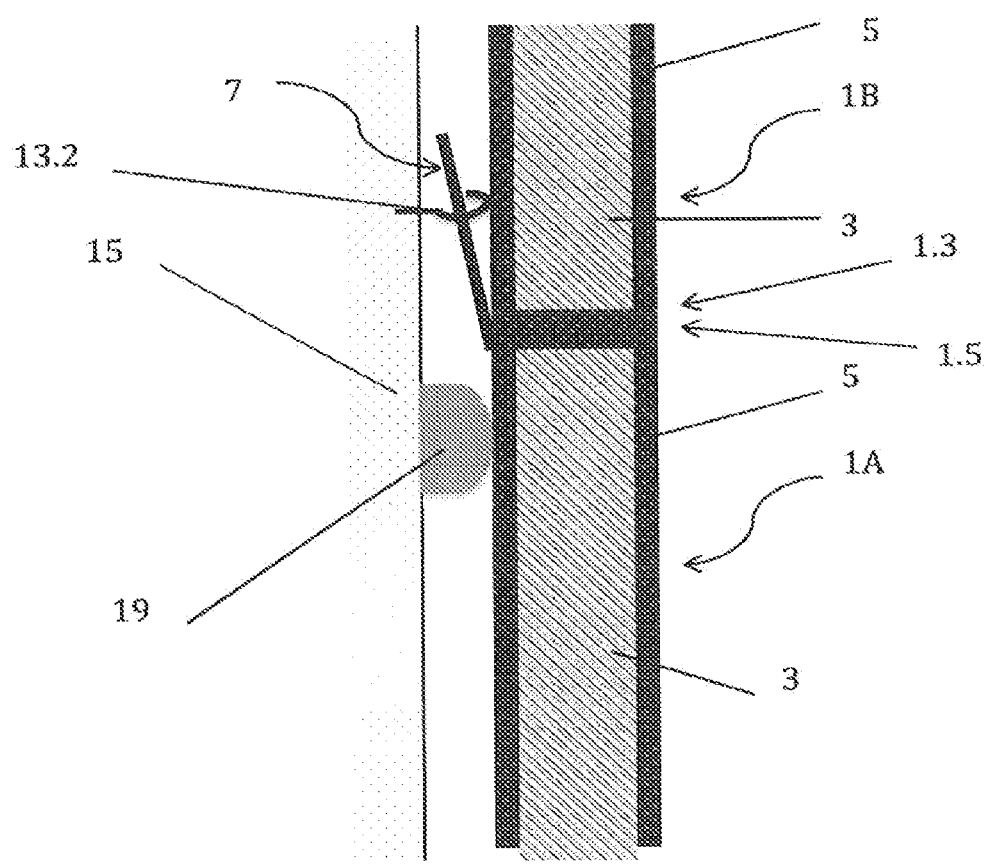

FIG. 6: View in section of the fixing of an encased insulating panel 1 to a wall 15 using a spacer block 19

Figure 7:
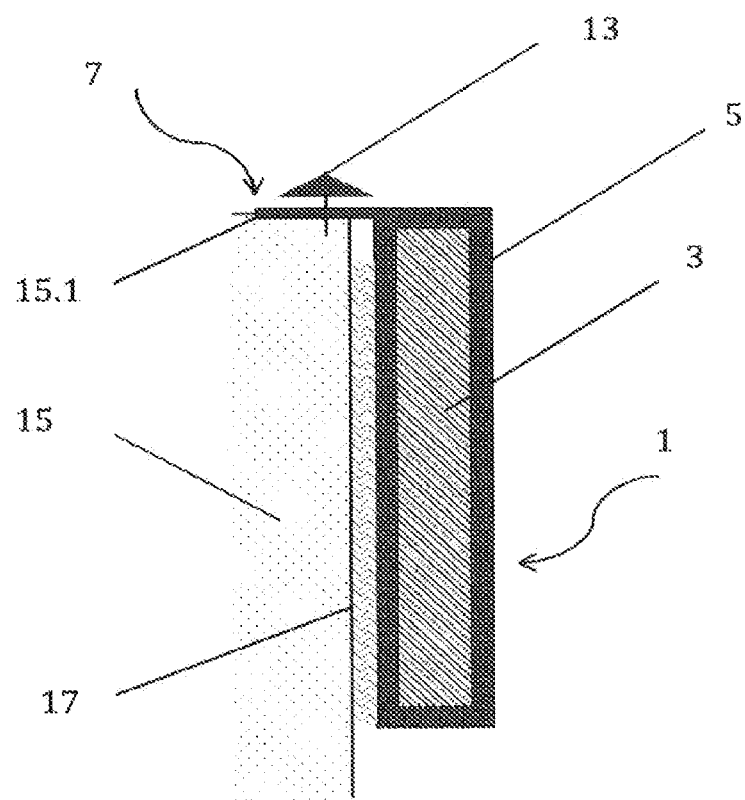

FIG. 7: View in section of the fixing of encased insulating panels 1A, 1B to the top 15.1 of a wall 15

Figure 8:
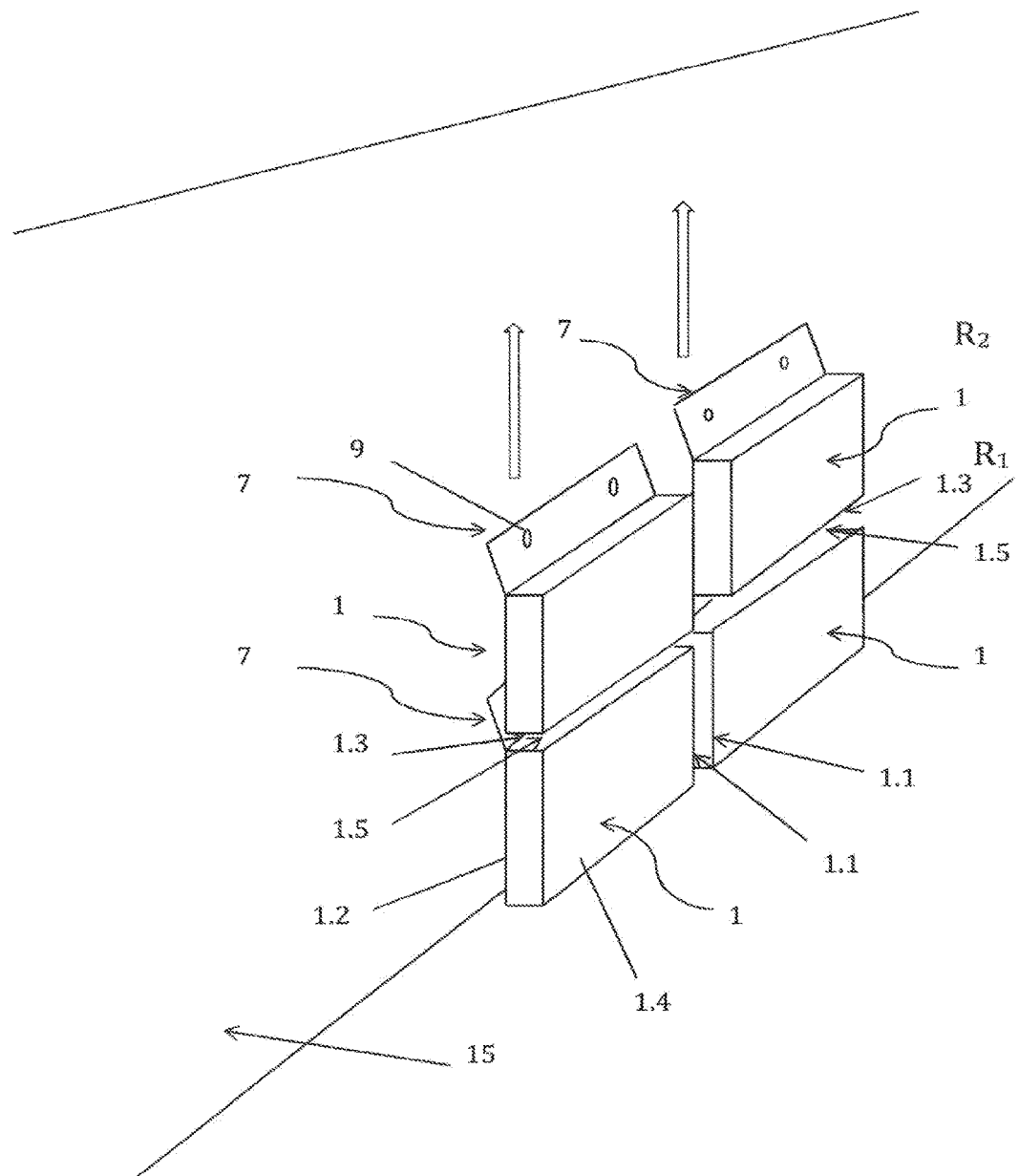

FIG. 8: Perspective view of a collection of encased insulating panels 1 in the process of being installed on a wall 15

Figure 9:
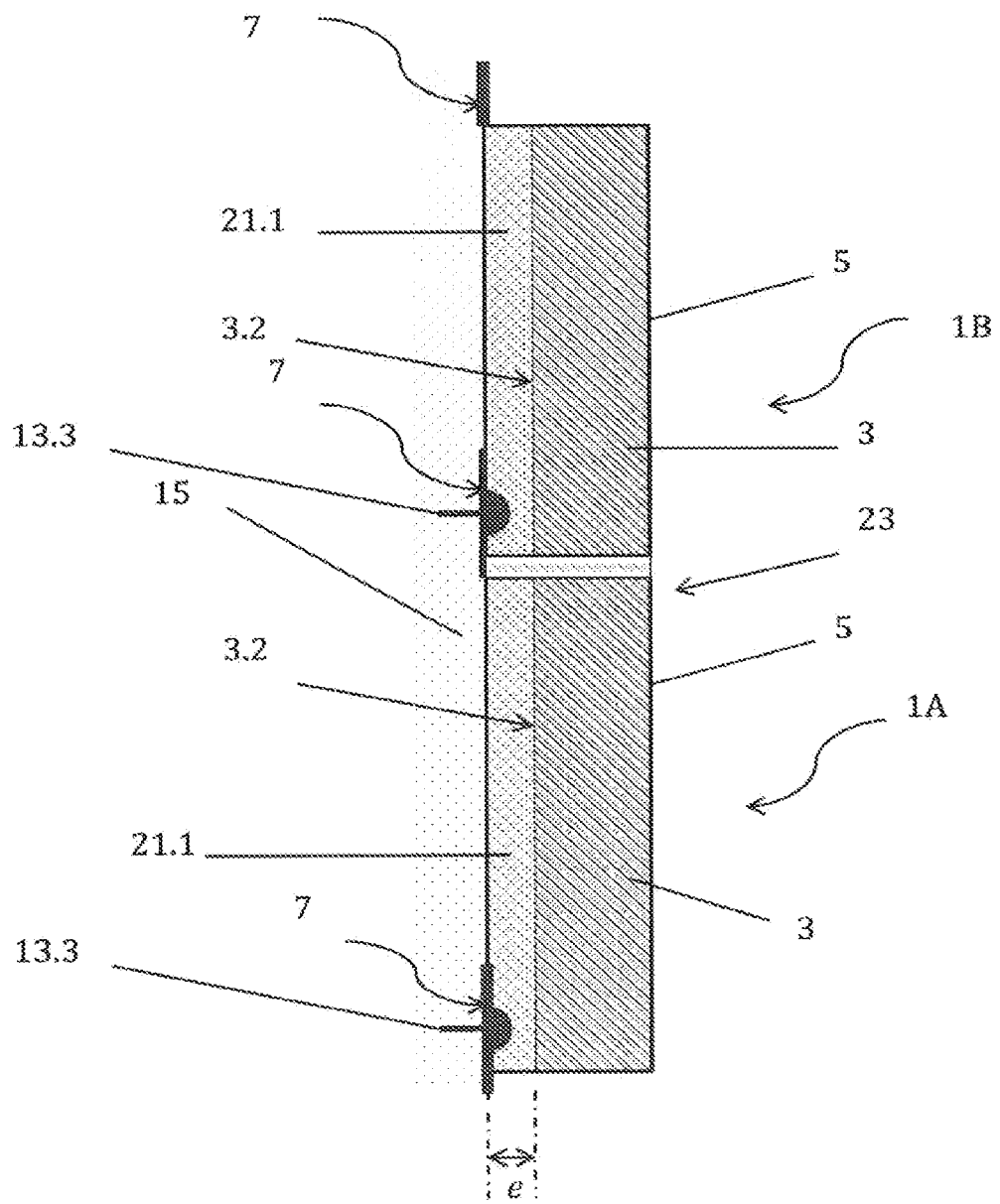

FIG. 9: View in section of the fixing of encased insulating panels 1A, 1B to a wall 15, the encased insulating panel 5 comprising an internal lining of a layer of foam 21.1.

Figure 10:
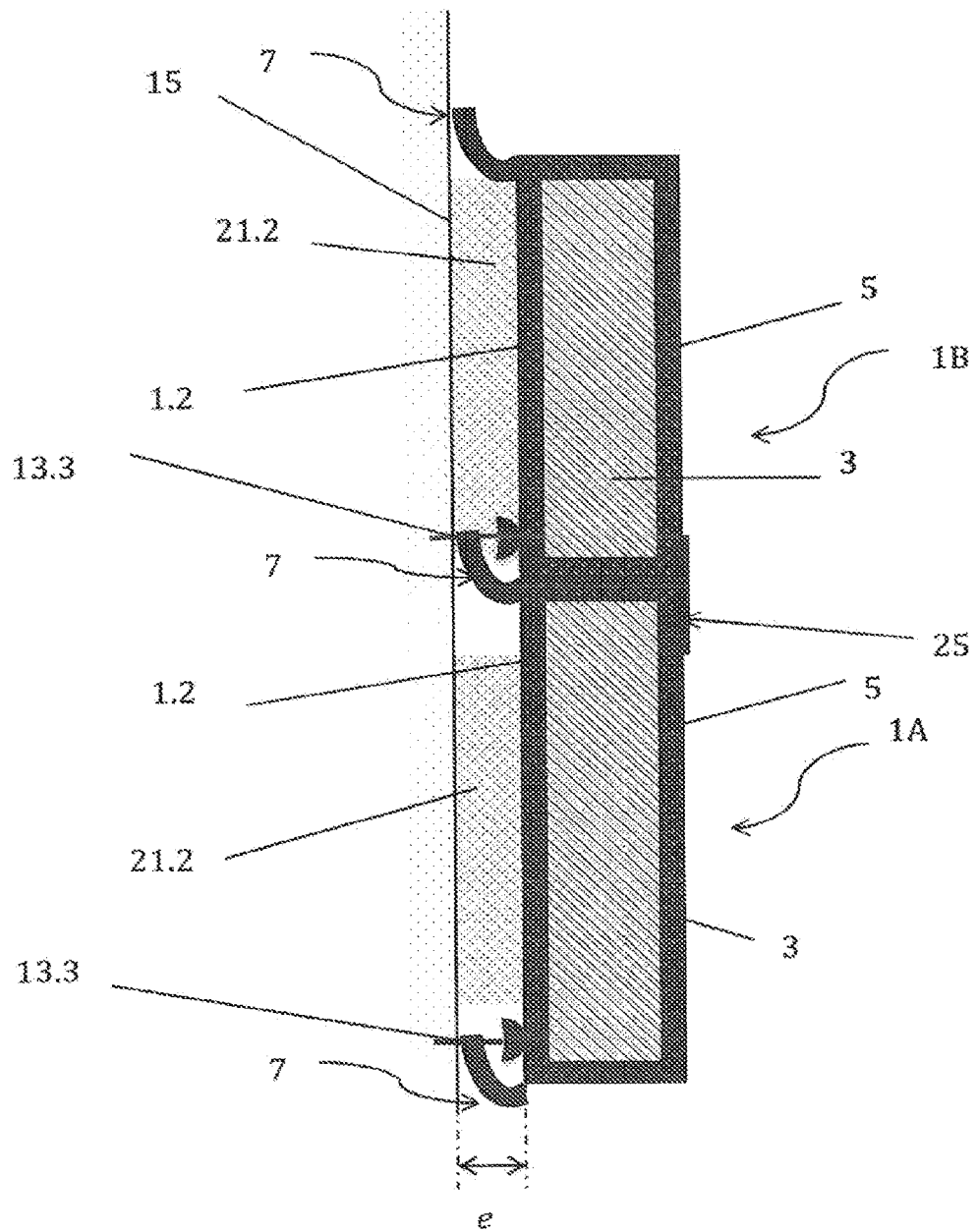

FIG. 10: View in section of the fixing of encased insulating panels 1A, 1B to a wall 15, an external lining of a layer of foam 21.2 being placed between the encased insulating panel and the wall.

Figure 11:
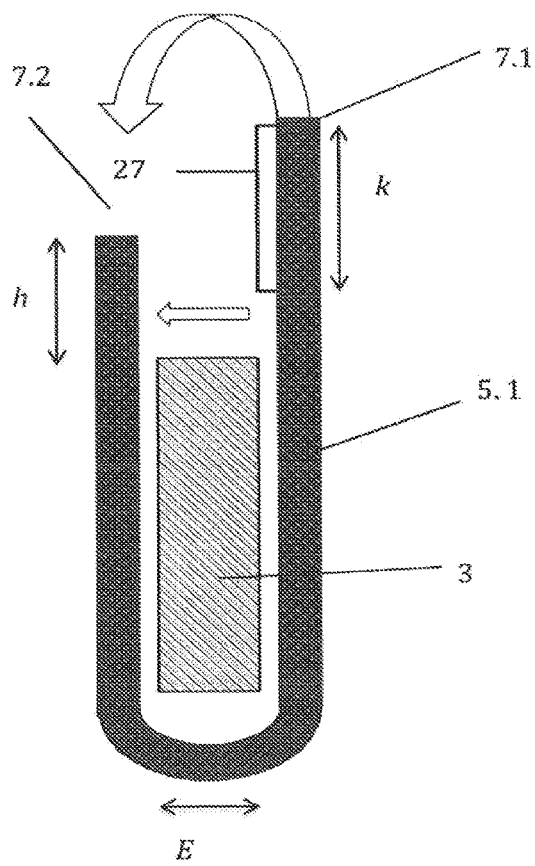
Figure 11:
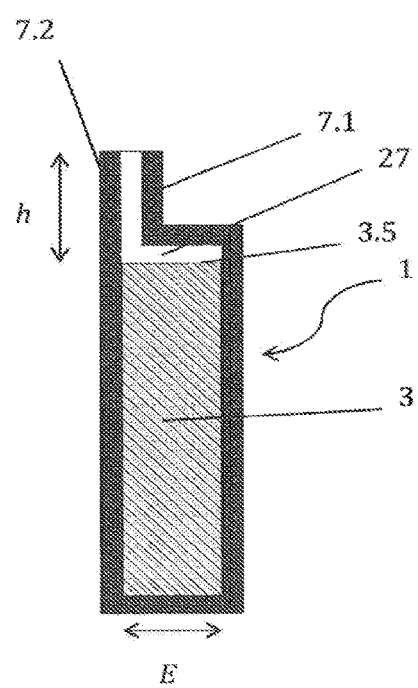

FIGS. 11A and 11B: Schematic view in section of a method of assembling and securing a fixing strip 5 to a panel 3.

Figure 12:
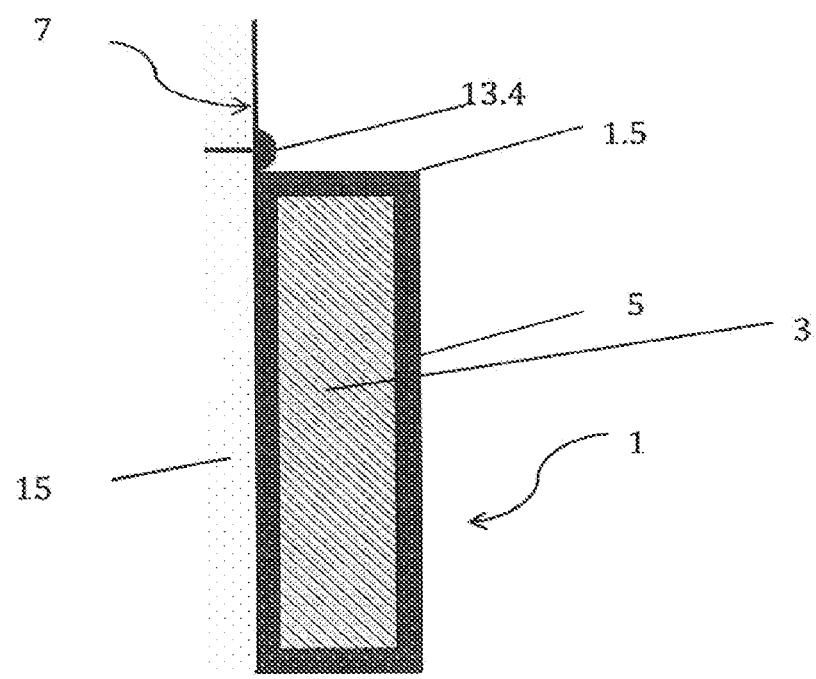

FIG. 12: View in section of one way of fixing an encased insulating panel 1 to a wall 15

Figure 13:
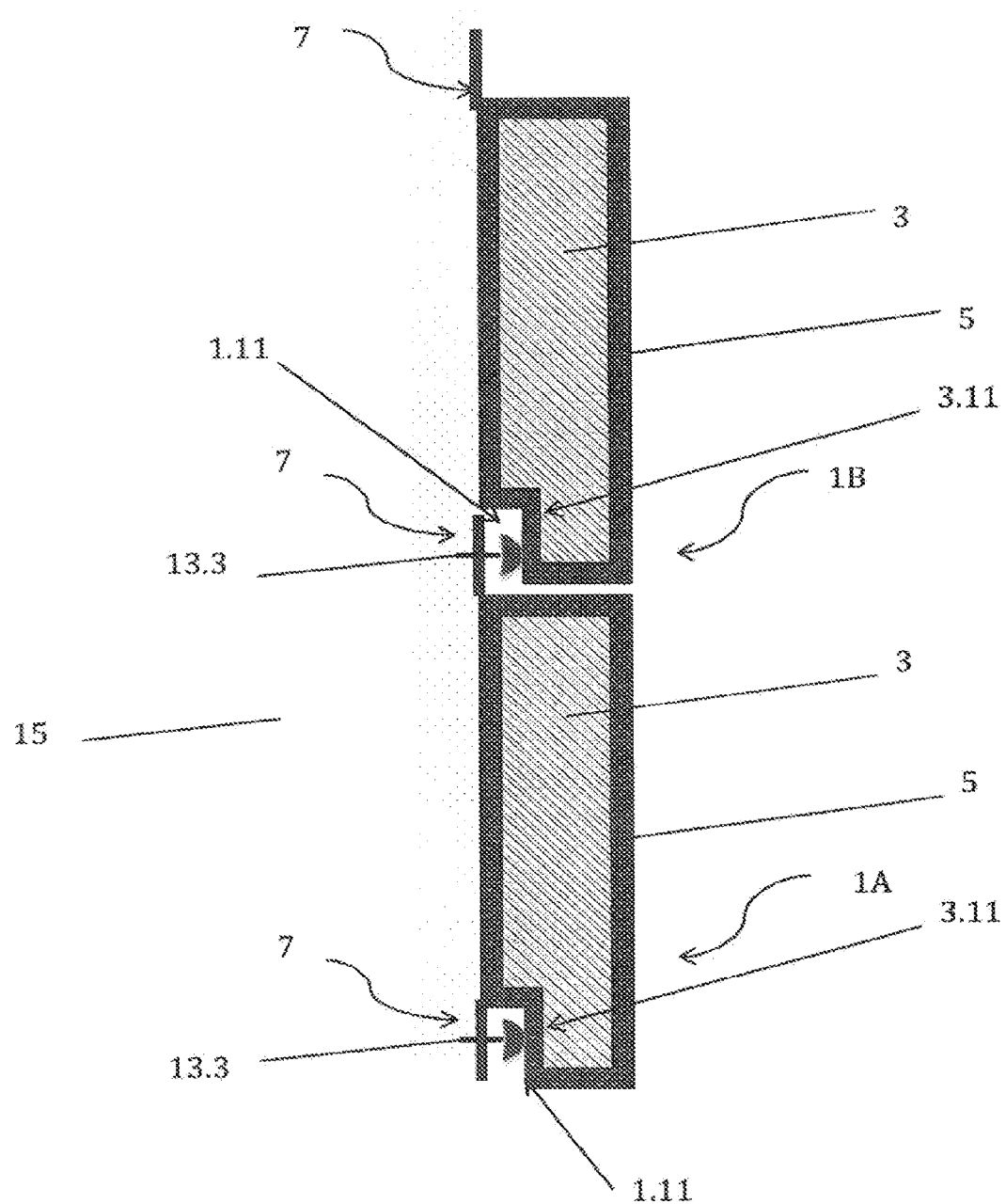

FIG. 13: View in section of the fixing to a wall 15 of encased insulating panels 1A, 1B comprising a housing 1.11 in which the fixing means 13.3 can be accommodated.

For ease of reading, the same numbering has been used in the various figures to denote the same components.

DETAILED DESCRIPTION

FIG. 1 schematically depicts a kit for installing and fixing lining elements 3 to a wall of a building. This kit comprises insulating panels 3 in the form of rectangular or square sheets, comprising two thin lateral faces 3.1 (the perimeter of which defines the perimeter of the panel within the meaning of the present description), two wide lateral faces: a rear face 3.2 and a front face 3.4, a thin lower face 3.3 and a thin upper face 3.5. The rectangular sheet is encased on the two wide lateral faces 3.2 and 3.4 and on its lower 3.3 and upper 3.5 faces by a strip 5.1 of a material in the form of a film. The strip of material 5.1 is of a width l identical to the width of the panel 3. The panel 3 and the strip 5.1 are positioned in such a way that the strip 5.1 covers the faces 3.2, 3.3, 3.4 and 3.5 without overhanging them. The strip of material 5.1 is adhesively bonded to the four faces 3.2, 3.3, 3.4 and 3.5 of the insulating panel 3 so as to form an envelope 5 secured to the panel 3 which ends at each of its ends in a flap 7.1 and 7.2. The adhesive bonding may be performed over the entirety of the fixing strip 5 or just part thereof. The flaps 7.1 and 7.2 are brought together and adhesively bonded together in vertical alignment with the rear face 3.2 to form an attachment flap 7. In FIG. 1, the flaps 7.1 and 7.2 are depicted as having the same length, but in some instances one flap may be longer than the other without that impeding the assembly and formation of an attachment flap 7. The strip of material 5.1 may be supplied separately from the insulating panels 3; it may be supplied ready for bonding, for example in the form of a self-adhesive strip covered with a protective film which is removed prior to bonding. Alternatively, encased panels 1 may be prefabricated and supplied directly to a building site as insulating panels ready for use.

According to another alternative form, the strip of material 5.1 may be fixed to the four faces 3.2, 3.3, 3.4 and 3.5 of the insulating panel 3 by any other suitable means such as thermal bonding, fixing by hook-and-loop tapes, for example. FIGS. 11A, 11B and 12 depict alternative ways of securing the strip of material 5.1 to the panels 3.

The material of which the film 5.1 is made up has sufficient mechanical strength that the envelope 5 supports the weight of the panel 3. For example, in order to be able to hold panels weighing approximately 5 kg, 20 mm thick, with a density of 250 kg/m$^3$, with two fixing points without tearing them, it is preferable for the fabric to have a tensile strength of at least 10N, and preferably of at least 20N on each of the fixings. For a panel made of the same material but 10 mm thick, use is advantageously made of a fabric which has a tearing strength of at least 5N, or better still, at least 10N. A person skilled in the art knows how to adapt the choice of fabric according to the weight of the panels and the number of fixing points using simple tearing strength tests. The film 5.1 may be made up of any woven or nonwoven material of sufficient mechanical strength. Advantageously, the insulating panel 3 is a VIP comprising a compression-resistant porous material and a barrier envelope encasing the porous material. The barrier envelope is gastight and allows an internal vacuum to be maintained. Alternatively, the insulating panel 3 may be made of any known insulating material such as rock wool or glass wool.

Advantageously, the envelope 5 is made of fiberglass fabric. In particular, certain qualities of fiberglass which are known to be compatible with a mortar composition are advantageous in this application.

In general, a panel 3 of VIP type has a thickness ranging from around to 10 to 50 mm. The envelope 5 preferably has a thickness of the order of a mm, for example 0.5 to 2 mm.

When the kit is used to construct an insulation on an exterior wall and the insulation is covered with a layer of mortar, a mortar resistant material such as a fiberglass fabric is preferably chosen for the envelope 5.

When the kit is used to construct insulation for an interior wall, for example lined by a self-supporting wall, the envelope 5 may be made from some other material provided the latter has sufficient mechanical strength to take the weight of the VIP. A film of reinforced polypropylene, etc. may notably be mentioned by way of example of a mechanically strong material.

When the kit is used to construct the insulation of a wall using breathable insulating panels such as glass wool or rock wool panels, a breathable material is advantageously chosen for the envelope 5.

Eyelets 9.1 surround two orifices 9 pierced in the attachment flap 7 and allow mechanical fixing of the panel 3 through the attachment flap 7 to a wall (which is not depicted in this figure). The presence of eyelets 9.1 makes it possible to improve the resistance of the fixing flap 7 to tearing. Other ways of reinforcing the edge of the orifices may be used, such as pressure thermal bonding. The fact that the panels 3 are fixed through the attachment flap 7 makes it possible to avoid any risk of damaging the panels 3 at the time of attaching them to the wall.

According to an alternative, provision may be made for the attachment flap 7 to be pierced directly on the building site, without the preliminary creation of orifices like those depicted in FIG. 9. This is what is done for example when the attachment flap 7 is nailed or stapled to a wall.

FIG. 2 schematically depicts a kit for installing and fixing lining elements 3 of a wall of a building comprising: an insulating panel 3 and fixing strips 5, which are positioned to be assembled but have not yet been adhesively bonded. This kit 1 differs from the one depicted in FIG. 1 in that the insulating panel 3 is wrapped by two strips 5.2 of a width l less than the width L of its wide lateral faces 3.2 and 3.4.

The two strips 5.2 are positioned symmetrically with respect to the vertical mid plane (X-X, Y-Y) of the panel 3 so that the weight of the panel 3 is evenly distributed across the two strips 5.2. It may be envisioned to employ a number of strips 5.2 greater than two, according to the width of the panel 3. Markings marked onto the insulating panels 3 may be envisioned to assist with the positioning of the fixing strips 5.

The fixing of the panel 3 to a wall (which has not been depicted) is performed using a fixing flap that is the result of the bringing together and adhesive bonding of the ends 7.1 and 7.2. For example, it is possible to plan to staple the fixing flap to the wall. If such a panel is to be covered with a layer of mortar, then steps are taken to cover the face 3.4 of the insulating panel 3 with a material that is compatible with mortars, such as a suitable sheet of fiberglass fabric for example.

FIG. 3 depicts an alternative form of the invention in which the panel 3 is encased in a strip 5.1 in an arrangement similar to that of FIG. 1. The two thin lateral faces 3.1 of the panel 3 are covered with a reinforcing strip 11 which may for example consist of a fabric coated with adhesive. The reinforcing strip 11 protrudes beyond the rear 3.2 and front 3.4 wide lateral faces so as to protect the corners 3.6 and 3.7 between the faces 3.2 and 3.1, 3.4 and 3.1. According to an alternative form that has not been depicted, the reinforcing strip could also be extended so that it protects the lower 3.8 and upper 3.9 corners of each of the thin lateral faces 3.1. The reinforcing strip reduces the risk of damaging the encased panels 1 when they are being handled, notably on a building site.

The encased panel 1 depicted in FIG. 4 differs from those of FIGS. 1, 2 and 3 in that the insulating panel 3 (not visible) comprises a flexible barrier envelope 5 with which it is completely covered. The envelope 5 is made in the known way of a film that can be thermally bonded and comprises several layers of distinct materials. For example, the internal layer may be made of a thermoplastic material to allow the thermal bonding. The envelope 5 may comprise at least one internal metallic layer and may comprise an external layer made of fiberglass so as to be compatible with the mortar compositions. In general, the envelope 5 according to this alternative form of the invention needs to meet the requirements of VIP envelopes: be gastight, thermally bondable, and must meet the requirements specific to the invention: mechanical strength. If need be, this mechanical strength is provided by the external layer made of fiberglass, particularly fiberglass fabric.

The envelope 5 is thermally bonded here along three sides of the panel (in this instance along the two thin lateral faces and the top face along the fold line 21 as explained hereinbelow). By way of novel feature, the envelope 5 is extended by two flaps 7.1 and 7.2. The flaps 7.1 and 7.2 are thermally bonded along the fold line 21. They may be thermally bonded over their entire surface area or just around their perimeter so as to form an attachment flap 7 which may optionally be pierced with orifices 9, possibly reinforced by eyelets 9.1. Aside from the thermal bonding along the line 21, the flaps 7.1 and 7.2 may be simply adhesively bonded to form the attachment flap 7. A reinforcement of the entire surface of the flaps 7.1 and 7.2 may potentially be provided by at least one laminated or adhesively bonded reinforcing strip, such as one made of fiberglass fabric.

The encased panel 1 is manufactured using the same means as those known for the manufacture of VIPs. Its manufacture furthermore involves the formation of the attachment flap 7.

FIG. 5 shows a partial view in section of three superposed insulating panels 3 that line a wall 15 of a building, that are fixed to this wall 15 by means of fixing strips 5 of the same type as those depicted in FIGS. 1, 2, 3 and 4. The middle encased panel 1A is fixed to the wall 15 using a rivet 13.1 that passes through an orifice 9 (not depicted in this figure) in the fixing flap 7. Alternatively, the fixing of the flap 7 to the wall 15 could be achieved using a nail, a screw, a staple or any other means known to those skilled in the art, on a flap not necessarily provided with orifices 9. A fixing using the same means allows the lower encased panel 1C to be attached. A layer of adhesive 17 allows the part of the strip 5 that covers the rear face 1.2 of the encased panel 1 to stick to the wall 15. The upper encased panel 1B is positioned in such a way that its lower face 1.3 faces the upper face 1.5 of the first panel 1A and so that the two faces 1.3 and 1.5 of the two encased panels 1A and 1B are contiguous. The same arrangement is made between the middle 1A and lower 1C panels. The layer of adhesive 17 is of a thickness suitable for compensating for the offset caused by the overlapping of the fixing 13.1 and of the fixing flap 7 by the encased panel 1B directly above 1A. This layer of adhesive also holds the panel in place during installation before the attachment flap 7 is fixed. It compensates for unevennesses of the surface of the wall 15. It may be applied to all or part of the rear surface of the panel or of the surface of the wall on which the rear face of the panel will be applied.

FIG. 6 schematically depicts a partial view in section of two elements 3 for lining a wall 15 of a building according to a way of fixing similar that of FIG. 5. Instead of a rivet, a hook 13.2 has been fixed in the wall and is used to attach the fixing flap 7 to the wall 15 through an eyelet 9 (not depicted in this figure). The offset caused by the overlap between an encased panel 1B and the attachment flap 7 of the panel 1A immediately below it is compensated for using a block 19. Thus, each encased insulating panel 1A, 1B is arranged substantially vertically. As an alternative, a bar of dimensions allowing it to play the part of a spacer piece could be used in place of the blocks.

FIG. 7 depicts one example of the fixing of an encased insulating panel 1 to the top of a wall 15 comprising a top face 15.1. The panel 7 is folded over onto the top face 15.1 of the wall 15. In this alternative form, a fixing using the fixing flaps 7 can be achieved over the entirety of a wall 15. Thus, the wall 15 can be covered over its entire height with encased insulating panels 1 according to the invention. In order to achieve this, it is necessary for the wall to have a vertical dimension corresponding to a whole number of panels or for one of the panels to be tailor made or alternatively for the height corresponding to a non-whole panel to be filled with an insulation that can be cut to size (mineral wool, EPS, PUR, PIR, etc.).

FIG. 8 depicts a system for lining a wall 15 of a building comprising: encased insulating panels 1 similar to those described hereinabove, these panels forming rows R1 and R2. Each encased insulating panel 1 has an internal face 1.2 placed facing the wall 15 and an external face 1.4 opposite the internal face 1.2, the attachment flap 7 of each panel 1 is fixed to the wall 15 using means such as those described hereinbelow: hooks, rivets, nails, screws, staples, adhesive, etc. Blocks or other types of spacer pieces as in FIG. 6 may be used to allow the encased panels 1 to be fixed vertically.

The encased panels 1 are arranged in such a way that each panel 1 of an upper row covers the attachment flap 7 of the panel 1 immediately below it, the lower face 1.3 of the upper panel 1 being assembled contiguously with the upper face 1.5 of the lower panel 1. Likewise the lateral faces 1.1 of each panel 1 are placed contiguously facing the lateral faces 1.1 of the adjacent panels. The arrows indicate that the wall insulation is being constructed from the bottom up. In the known way, the extremities of the wall (corners, openings, ceilings) may be insulated using VIPs that are made to measure or using insulating panels made of another material which can be cut or drilled without impairing their insulating properties, such as glass wool or rock wool panels. If the wall 15 is surmounted by a ceiling, the upper part of the wall, corresponding to the last row of insulation, is also produced using insulating panels made from some other material and which can be cut or drilled without impairing their insulating properties. If the wall has a free top end, the last row can be fixed using a system like that described in FIG. 7.

FIG. 9 depicts two encased insulating panels 1A, 1B each one made up of an insulating panel 3, for example of the VIP type, of a lining with a sheet of compressible foam 21.1 and of a fixing strip 5. The sheet of foam 21.1 takes the form of a rectangular sheet of dimensions allowing it to cover the rear face 3.2 of the panel 3 which is parallel to the wall 15 and faces the wall 15. The assembly made up of the panel 3 and of the sheet of foam 21.1 is wrapped by a fixing strip 5. In this figure, the fixing strip 5 is depicted using a fine line so that the function of the sheet of foam 21.1 is more readily apparent. This sheet has a thickness e that allows the encased insulating panels 1A, 1B to be positioned against the wall 15. The attachments 13.3 (nails or screws for example) are inserted into the thickness of the foam 21.1 which deforms under the pressure applied during the laying of the panel. The layer of foam 21.1 conforms to the small imperfections of the wall 15. The thickness e of the sheet of foam 21.1 with respect to the thickness of the insulating panel 3 is greater in FIG. 9 than it is in real life, so as to better illustrate its function.

A layer of adhesive 23 between the panels 1A and 1B allows the two panels to be secured together. Alternatively, a double-sided adhesive may perform the same function. It is also possible to plan to position an adhesive at the junction where the two panels 1A and 1B meet, as illustrated in FIG. 10.

In general, a panel 3 of VIP type has a thickness of around 10 to 50 mm. The sheet of compressible foam 21.1 advantageously has a thickness of a few millimeters. Its thickness is chosen according to the type of attachment 13.3, and the unevenness of the wall 15.

FIG. 10 depicts two encased insulating panels 1 each one made up of an insulating panel 3, advantageously of VIP type, and of a fixing strip 5. A sheet of compressible foam 21.2 is placed between each encased insulating panel 1A, 1B and the wall 15. The sheet of compressible foam 21.2 takes the form of a rectangular sheet of dimensions allowing it to cover all or part of the face of the panels 1A, 1B which is parallel to the wall 15. The sheet of foam 21.2 may or may not be adhesively bonded to the encased panels 1A, 1B. The sheet of foam 21.2 is of a thickness e that allows the encased insulating panels 1A, 1B to be positioned against the wall 15. The attachments 13.3 (nails or screws for example) are inserted into the thickness of the foam 21.2 which deforms under the pressure exerted at the time of fitting (top part of the system depicted) or alternatively, the attachments are positioned next to the sheet in a space that forms a housing (bottom part of the system depicted). The layer of foam 21.2 conforms to the small imperfections of the wall 15. The junction where the panels 1A and 1B meet is closed off using an adhesive 25.

FIG. 11A depicts an alternative form of a kit according to the invention during assembly: the insulating panel 3 is surrounded by an envelope material 5.1 which has two free ends 7.1 and 7.2. A double-sided adhesive tape 27 is placed at the end 7.2 of the envelope 5.1. The double-sided adhesive tape 27 is of a length k greater than the sum of h+E, h representing the length of the end 7.2 and E representing the width of the insulating panel 3. Thus, folding the end 7.2 over and bringing it closer to the end 7.1 as indicated by the arrows makes it possible to result in an encased insulating panel 1 depicted in FIG. 11B: the insulating panel 3 is wrapped by the fixing strip 5, the fixing strip 5 is fixed by the adhesive 27 to the upper face 3.5 of the panel 3. The two ends 7.1 and 7.2 are bonded together with the adhesive 27 to form the fixing flap 7. The assembly forms a monoblock entity. Alternatively, the same type of fixing could be achieved using a layer of adhesive or an attachment of the hook-and-loop tape type.

According to an alternative form depicted in FIG. 12, it is possible to bond only the upper parts of the fixing strips 5 to form a fixing flap 7 or even possible not to bond them at all if the fixing points 13.4 are very close to the top edge 1.5 of the panel 1. That arrangement prevents the fixing strip 5 from being detached from the panel 3 under the effect of its suspended weight.

According to the alternative form depicted in FIG. 13, the two encased insulating panels 1A and 1B are each made up of an insulating panel 3 and of a fixing strip 5. A cutout 3.11 is formed in the bottom of the panel 3 and forms a cavity 1.11 in the encased insulating panels 1A, 1B. This cavity is able to accommodate the attachment 13.3 of the panel immediately below thereby ensuring that the panels 1A, 1B remain parallel on the wall 15.

The invention claimed is:

1. An encased insulating panel comprising:
    a vacuum insulation panel including a rectangular sheet including a compression-resistant porous material and a barrier envelope which in gastight manner encases the porous material wherein the vacuum insulation panel includes a front face, a rear face, two lateral faces, an upper face, and a lower face,
    wherein at least one fixing strip having a width (l) and a length, the length being greater than the perimeter of the vacuum insulation panel, forms an envelope around at least part of the top face, the front face, the lower face, and the rear face, the at least one fixing strip being assembled securely to the vacuum insulation panel and including two free ends which can be joined together to form an attachment flap.

2. The encased insulating panel as claimed in claim 1, which further includes fixing means for fixing the attachment flap mechanically to a wall, notably perforations in the attachment flap.

3. The encased insulating panel as claimed in claim 1, wherein the fixing strip constitutes the barrier envelope and in gastight manner encases the porous material.

4. The encased insulating panel as claimed in claim 1, wherein the fixing strip is made of fiberglass or based on fiberglass.

5. The encased insulating panel as claimed in claim 1, wherein the fixing strip is fixed to the vacuum insulation panel by adhesive bonding or thermal bonding.

6. The encased insulating panel as claimed in claim 1, wherein the width (l) of the fixing strip is substantially equal to the width (L) of the vacuum insulation panel.

7. The encased insulating panel as claimed in claim 1, further including at least two fixing strips each having a width (l) less than the width (L) of the vacuum insulation panel.

8. The encased insulating panel as claimed in claim 1, further including a lining sheet, said sheet being of compressible foam, and wrapped by the fixing strip.

9. The encased insulating panel as claimed in claim 1, further including a reinforcing strip, wherein the reinforcing strip covers at least part of the rear face, the lateral face, the front face, a corner between the rear face and the lateral face, and a corner between the lateral face and the front face.

10. A kit for mounting the encased insulating panel as claimed in claim 1, comprising:

the vacuum insulation panel including the rectangular sheet including the compression-resistant porous material and the barrier envelope which in gastight manner encases the porous material wherein the vacuum insulation panel includes the front face, the rear face, two lateral faces, the upper face, and the lower face, and the at least one fixing strip wherein the length of the fixing strip being greater than the perimeter of the vacuum insulation panel, each fixing strip being adapted for forming the envelope around at least part of the top face, the front face, the lower face, and the rear face while keeping two free ends which can be joined together to form the attachment flap.

11. The kit as claimed in claim 10, further including means for assembling the fixing strip securely to the vacuum insulation panel to form an encased insulating panel.

12. A method for lining a wall of a building with encased insulating panels as claimed in claim 1, said method comprising the following steps:

fixing the attachment flap of a first encased insulating panel to the wall using a mechanical fixing means, and fixing the attachment flaps of the other panels so as to form a contiguous assembly of insulating panels, each panel being arranged so that said panel covers the fixing flap of another panel immediately below said panel.

13. The lining method as claimed in claim 12, further comprising the following preliminary steps:

assembling onto each vacuum insulation panel at least one fixing strip of a length greater than the perimeter of the vacuum insulating panel, so that said fixing strip forms the barrier envelope around at least part of the top face, the front face, the lower face, and the rear face, so as to keep two free ends at the end of the fixing strip, and bringing the ends of the fixing strip together to form the attachment flap so as to form the encased insulating panel.

14. The lining method as claimed in claim 12, wherein each encased insulating panel includes an internal face facing toward the wall and an external face opposite the internal face, and the internal faces of the encased insulating panels are held away from the wall and arranged substantially vertically using a layer of adhesive and/or using spacer piece(s) or a sheet of compressible foam.

15. The lining method as claimed in claim 12, wherein each encased insulating panel includes an internal face facing toward the wall and an external face opposite the internal face, and the method further includes applying a layer of mortar to the external faces of the assembled encased insulating panels.

16. A system for lining a wall of a building comprising a plurality of encased insulating panels as claimed in claim 1, and wherein:

the encased insulating panels are set out in at least one layer of panels forming rows, each encased insulating panel includes an internal face facing toward the wall and an external face opposite the internal face, the attachment flap of each encased insulating panel is fixed to the wall using mechanical fixing means, the panels are arranged in such a way that each panel of an upper row covers the attachment flap of another panel immediately below said panel, the lower face of the upper panel being assembled contiguously with the upper face of the lower panel.

* * * * *